United States Patent Office

3,466,159
Patented Sept. 9, 1969

3,466,159
PROCESS AND CATALYST FOR PRODUCTION OF METHANE-RICH GAS
Abe Warshaw, Clark, John S. Negra, South Plainfield, and Arnold R. Bernas, Nixon, N.J., assignors to Chemical Construction Corporation, New York, N.Y., a corporation of Delaware
No Drawing. Filed Mar. 26, 1965, Ser. No. 443,072
Int. Cl. C10l 3/00
U.S. Cl. 48—213                              13 Claims

ABSTRACT OF THE DISCLOSURE

An improved process and catalyst are provided for the conversion of a normally liquid hydrocarbon typically containing from three to ten carbon atoms per molecule and having a boiling point in the range of 100° F. to 500° F., to a gas stream principally containing methane, by catalytic reaction of the liquid hydrocarbon in the vapor state with steam at elevated temperature and in the presence of hydrogen. The improvement of this process entails the provision of a novel catalyst for the reaction, which contains manganese dioxide in addition to a catalytic agent selected from the group consisting of nickel oxide and cobalt oxide.

---

The present invention relates to the conversion of a normally liquid hydrocarbon such as naphtha into a methane-rich gas stream by catalytic reaction with steam in the presence of hydrogen. It has been determined that the addition of manganese dioxide to the conventional nickel oxide or cobalt oxide catalyst employed for this reaction is highly advantageous, and produces a catalyst with greater conversion capacity and greatly extended activity duration.

The conversion of a normally liquid hydrocarbon to a methane-rich gas stream by reaction with steam is carried out in practice in order to produce a gas stream which may be directly employed as a town gas or fuel gas. In other instances, the methane-rich gas stream is mixed with further steam and catalytically reformed to produce a hydrogen-carbon monoxide synthesis gas which may be ultimately employed for the catalytic synthesis of ammonia or methanol. In any case, the conversion of a normally liquid hydrocarbon to a methane-rich gas stream is a highly important industrial process, particularly in areas or countries which are lacking in natural gas.

The usual liquid hydrocarbon employed in the process is naphtha, which is a petroleum distillate fraction containing liquid hydrocarbons having from 3 to 10 carbon atoms per molecule. Naphtha usually contains a substantial proportion of paraffinic hydrocarbons and generally has a boiling point or boiling range within the range of 100° F. to 500° F. Varying proportions of naphthenes and aromatics will also usually be present in naphtha. Other liquid hydrocarbons capable of being vaporized such as kerosene may also be employed in the process.

The gasification process generally consists of vaporizing the normally liquid hydrocarbon, and mixing the hydrocarbon vapor with steam and a minor proportion of hydrogen. The resulting gaseous mixture is heated and passed through a catalyst bed which in the prior art has consisted of precipitated nickel oxide or cobalt oxide deposited on a suitable carrier and at least partially reduced to the metallic state. It is customary in the art, however, to consider the catalyst composition in terms of equivalent nickel oxide or cobalt oxide content, even though the catalytic agent may actually be present at least partially as the metal. This terminology will be followed in the present case, that is, catalyst compositions will be designated as equivalent nickel oxide or cobalt oxide. Reaction takes place between the hydrocarbon vapor and steam, with the formation of a methane-rich gas stream, which may contain other reaction products such as carbon monoxide, hydrogen and carbon dioxide.

In the present invention, the gaseous mixture of vaporized hydrocarbon, steam and hydrogen is passed through a catalyst bed or mass containing nickel oxide or cobalt oxide, together with manganese dioxide. It has been determined that the presence of manganese dioxide has a highly important and beneficial effect, in prolonging the active life of the catalyst bed during which complete reaction takes place, and also in permitting greater throughput of reaction mixture per cubic foot of catalyst bed. The process is carried out most effectively with a catalyst bed having a composition containing (by weight) in the range of from about 45% to 60% of nickel oxide or cobalt oxide, together within the range of about 3% to 10% manganese dioxide. As mentioned supra, the nickel or cobalt contents may actually be present in the catalyst mass at least partially in the reduced metallic state, however equivalent oxide composition is reported on analysis, as is customary in the art. Similarly, the manganese content may actually be present in practice at least partially as the sub-oxide, however for purposes of analysis and composition terminology the manganese content is reported as equivalent manganese dioxide.

These catalytic agents will usually be deposited on alumina or other suitable carrier such as kaolin or magnesia, together with a suitable binder such as phosphorus pentoxide, graphite or hydraulic cement. Thus, the preferred catalyst composition of the present invention includes from about 45% to 60% of nickel oxide or cobalt oxide, from about 3% to 10% manganese dioxide, from about 1% to 8% phosphorus pentoxide, and an alumina carrier. Optimum results are obtained with a catalyst composition containing from about 54% to 57% of nickel oxide or cobalt oxide, together with about 5% to 10% of manganese dioxide, about 1% to 8% phosphorus pentoxide binder, and an alumina carrier.

It is an object of the present invention to provide an improved process and catalyst for the conversion of normally liquid hydrocarbons to a methane-rich gas stream by reaction with steam.

Another object is to improve the nickel oxide or cobalt oxide catalyst employed for the conversion of normally liquid hydrocarbons to a methane-rich gas stream by reaction with steam, by the addition of a catalytically effective amount of manganese dioxide to the catalyst mass.

A further object is to provide an improved catalyst composition for the catalytic conversion of normally liquid hydrocarbons to a methane-rich gas stream by reaction with steam.

An additional object is to provide a catalyst which has greater capacity per unit volume of catalyst bed and a longer active life, for the conversion of normally liquid hydrocarbons to a methane-rich gas stream by reaction with steam.

These and other objects and advantages of the present invention will become evident from the description and examples which follow. A catalyst composition was prepared in accordance with the present invention by mixing raw materials containing the desired catalytic agents with aluminum nitrate which yielded the alumina carrier on further treatment. Thus, 1000 parts by weight of $Al(NO_3)_3 \cdot 9H_2O$, 1500 parts by weight of $Ni(NO_3)_2 \cdot 6H_2O$ and 250 parts by weight of a 50% solution of $Mn(NO_3)_2$ were mixed and co-precipitated into a gel form by mixing with a hot 30% solution of sodium carbonate at pH 7.5. The precipitate was washed and filtered several times and then dried at 170° C. for 48 hours. Phosphoric acid and graphite binding agents were added to the dried catalyst material, and the resulting mixture was ground and pelletized to a suitable size. The catalyst was reduced with hydrogen, in order to at least partially convert the nickel content to the metallic state, and was then employed in the examples infra. For comparison purposes, a nickel-alumina catalyst was prepared in a similar manner, without the inclusion of manganese.

The manganese-containing catalyst mass of the present invention and the conventional nickel-alumina catalyst were employed to catalyze the reaction of steam with vaporized naphtha in the presence of hydrogen. The naphtha was a mixture of liquid hydrocarbons containing from 3 to 10 carbon atoms per molecule, with a boiling range of 120° F. to 388° F. and a specific gravity of 0.72 at 60° F. The naphtha analyzed (by weight) 57.1% paraffins, 31.0% naphthenes, 11.3% aromatics and 0.6% olefins, and contained 1 p.p.m. sulfur. Following are comparative examples of the conversion of this naphtha feed stream to a methane-rich gas stream, using the catalyst composition of the present invention and the standard nickel-alumina catalyst.

Example I

The activity of the catalyst of the present invention was compared to that of conventional nickel catalyst, in terms of conversion capacity. Identical gaseous feed streams of a mixture of vaporized naphtha, steam and hydrogen were passed through two parallel catalyst beds of equal volume under identical operating conditions, and the throughput rate was increased by gradual increments. The first catalyst bed contained the catalyst composition of the present invention, and the other catalyst bed contained a conventional nickel alumina catalyst. The percent conversion of the naphtha hydrocarbons to gaseous products at each throughput rate was measured. Operating pressure was 250 p.s.i.g. and a normal temperature range of 825° F. to 875° F. was maintained, although it was determined that the process was efficiently operable within a temperature range of 775° F. to 900° F., or even outside of this range. The steam/carbon ratio in the mixed feed stream was 2.0 mols/mol, and the hydrogen/steam ratio was 3.9 mols/100 mols. Following are the test results.

TABLE I

| Run No. | Space velocity [1] | Percent conversion of hydrocarbon to gaseous products [2] | |
|---|---|---|---|
| | | Nickel-manganese alumina catalyst bed | Nickel alumina catalyst bed |
| 1 | 1,400 | | 100 |
| 2 | 2,800 | | 100 |
| 3 | 3,000 | 100 | |
| 4 | 3,500 | | 98 |
| 5 | 4,000 | 100 | |
| 6 | 4,600 | | 70 |
| 7 | 5,000 | 90 | |

[1] Standard cubic feet per hour of carbon in hydrocarbon vapor at standard 1 atm. pressure and 32° F., per cubic foot of catalyst bed.
[2] Typical composition (dry basis) in percent by volume: 51.6 to 67.7 methane, 21.5 to 23.4 carbon dioxide, 8.4 to 26.4 hydrogen and 0.4 to 1.2 carbon dioxide.

From the results in Table I supra, it is apparent that the catalyst composition of the present invention maintained 100% conversion at substantially higher space velocity than with the standard nickel-alumina catalyst bed. Thus, at the lower space velocities of runs 1–3 both catalyst beds maintained 100% conversion. Comparing runs 4 and 5, it is apparent that the catalyst bed of the present invention maintained 100% conversion (run 5) at a space velocity greater than that at which the conversion attained by the standard catalyst composition had declined to less than 100% (run 4). Similarly, comparing runs 6 and 7, the catalyst composition of the present invention maintained 90% conversion (run 7) at a space velocity of 5000, while the conversion attained with the standard catalyst (run 6) had already declined to 70% at a lower space velocity of 4600.

Example II

The activity of the catalyst of the present invention was compared to that of conventional nickel catalyst, in terms of duration of active life. Identical gaseous feed streams of a mixture of vaporized naphtha, steam and hydrogen were passed through two parallel catalyst beds of equal volume under identical operating conditions including equal and constant throughput rate, and the duration of active catalyst life was measured as a function of the on stream time until decrease in catalyst activity took place. The first catalyst bed contained the catalyst composition of the present invention, and the other catalyst bed contained a conventional nickel alumina catalyst. The present conversion of the naphtha hydrocarbons to gaseous products was measured at successive time intervals, until significant decrease in percent conversion took place. The space velocity through the parallel beds was 3000 standard cubic feet of carbon in hydrocarbon vapor at standard 1 atm. pressure and 32° F., per cubic foot of catalyst bed. Operating pressure was 250 p.s.i.g., inlet gas stream temperature range to the catalyst beds was 800° F. to 850° F. and outlet gas stream temperature range from the catalyst beds was 850° F. to 900° F. The steam/carbon ratio in the feed streams was 2.0 mol/mol and the hydrogen/steam ratio was 4.7 mol/100 mols. Following are the test results.

TABLE II

| Product gas analysis No. | On stream time-hours | Percent conversion of hydrocarbon to gaseous products [1] | |
|---|---|---|---|
| | | Nickel-manganese-alumina catalyst bed | Nickel alumina catalyst bed |
| 1 | 5 | 100 | 100 |
| 2 | 30 | 100 | |
| 3 | 50 | 100 | 100 |
| 4 | 75 | 100 | |
| 5 | 100 | 100 | 95 |
| 6 | 125 | 100 | |
| 7 | 150 | 100 | 90 |
| 8 | 200 | 100 | |
| 9 | 250 | 100 | |
| 10 | 300 | 100 | |
| 11 | 350 | 100 | |
| 12 | 400 | 100 | |
| 13 | 425 | 100 | |
| 14 | 450 | 96 | |
| 15 | 510 | 94 | |

[1] Typical composition range same as Table I.

From the results of Table II supra, it is apparent that the catalyst composition of the present invention has a greatly extended service life with 100% conversion, compared to the conventional nickel-alumina catalyst. Thus, the conventional nickel-alumina catalyst showed significant decrease in catalytic activity after 50 hours on stream time, since the percent conversion with the conventional catalyst was only 95% at 100 hours on stream time (analysis 5). In contrast, the improved catalyst composition of the present invention showed a significant decrease in catalyst activity after 425 hours on stream time as evidenced by analysis 14. Thus, the active life of the catalyst of the present invention is at least 4 times as great as that of the conventional catalyst.

We claim:

1. A process for the production of a gas stream principally containing methane by catalytic reaction between steam and a vaporized normally liquid hydrocarbon in the presence of hydrogen, said liquid hydrocarbon containing from three to ten carbon atoms per molecule and having a boiling point in the range of 100° F. to 500° F., which comprises contacting a gaseous mixture of steam, vaporized normally liquid hydrocarbon and hydrogen with a catalyst comprising a catalytic agent selected from the group consisting of nickel oxide and cobalt oxide, and an effective catalytic proportion of manganese dioxide, whereby said vaporized normally liquid hydrocarbon reacts with said steam in the presence of hydrogen to yield a product gas stream principally containing methane.

2. The process of claim 1, in which a binder comprising phosphorus pentoxide is provided in the catalyst.

3. The process of claim 1, in which a carrier comprising alumina is provided in the catalyst.

4. A process for the production of a gas stream principally containing methane by catalytic reaction between steam and a vaporized normally liquid hydrocarbon in the presence of hydrogen, said liquid hydrocarbon containing from three to ten carbon atoms per molecule and having a boiling point in the range of 100° F. to 500° F., which comprises contacting a gasous mixture of steam, vaporized normally liquid hydrocarbon and hydrogen with a catalyst comprising in the range of about 45% to 60% of a catalytic agent selected from the group consisting of nickel oxide and cobalt oxide, in the range of about 3% to 10% manganese dioxide, a suitable binder, and a carrier, whereby said vaporized normally liquid hydrocarbon reacts with said steam in the presence of hydrogen to yield a product gas stream principally containing methane.

5. The process of claim 4, in which the binder for the catalyst is phosphorus pentoxide.

6. The process of claim 4, in which the carrier in the catalyst is alumina.

7. The process of claim 4, in which the catalytic agent is nickel oxide.

8. A process for the production of a gas stream principally containing methane by catalytic reaction between steam and a vaporized normally liquid hydrocarbon in the presence of hydrogen, said hydrocarbon containing from three to ten carbon atoms per molecule and having a boiling point in the range of 100° F. to 500° F., which comprises heating a gaseous mixture of steam, vaporized hydrocarbon and hydrogen to a temperature in the range of 775° F. to 900° F., and contacting the heated gaseous mixture with a catalyst comprising in the range of about 54% to 57% of a catalytic agent selected from the group consisting of nickel oxide and cobalt oxide, in the range of about 5% to 10% manganese dioxide, in the range of about 1% to 8% phosphorus pentoxide, and an alumina carrier, whereby said vaporized hydrocarbon reacts with said steam in the presence of hydrogen to yield a product gas stream principally containing methane.

9. The process of claim 8, in which the catalytic agent is nickel oxide.

10. The process of claim 8, in which the normally liquid hydrocarbon is naphtha.

11. A catalyst composition for the conversion of a vaporized normally liquid hydrocarbon containing from three to ten carbon atoms per molecule and having a boiling point in the range of 100° F. to 500° F. to a gas stream principally containing methane by reaction with steam in the presence of hydrogen, which comprises between about 45% to 60% of a catalytic agent selected from the group consisting of nickel oxide and cobalt oxide, between 3% to 10% manganese dioxide, and a carrier.

12. A catalyst composition for the conversion of a vaporized normally liquid hydrocarbon containing from three to ten carbon atoms per molecule and having a boiling point in the range of 100° F. to 500° F., to a gas stream principally containing methane by reaction with steam in the presence of hydrogen, which comprises between about 54% to 57% of a catalytic agent selected from the group consisting of nickel oxide and cobalt oxide, between about 5% to 10% manganese dioxide, between about 1% to 8% phosphorus pentoxide, and a carrier.

13. The composition of claim 12, in which the carrier is alumina.

References Cited

UNITED STATES PATENTS

| 2,038,566 | 4/1936 | Huettner et al. | 252—466 XR |
| 2,119,566 | 6/1938 | Williams. | |
| 3,103,423 | 9/1963 | Pearce | 48—214 |
| 3,334,055 | 8/1967 | Dowden et al. | |

FOREIGN PATENTS

| 969,637 | 9/1964 | Great Britain. |

MORRIS O. WOLK, Primary Examiner

R. E. SERWIN, Assistant Examiner

U.S. Cl. X.R.

48—214; 252—437, 466